Jan. 12, 1932.   R. L. HILL   1,840,392
PROCESS FOR DETERMINING THE PHYSICAL CURD CHARACTER OF MILK
Filed Oct. 13, 1928   2 Sheets-Sheet 1
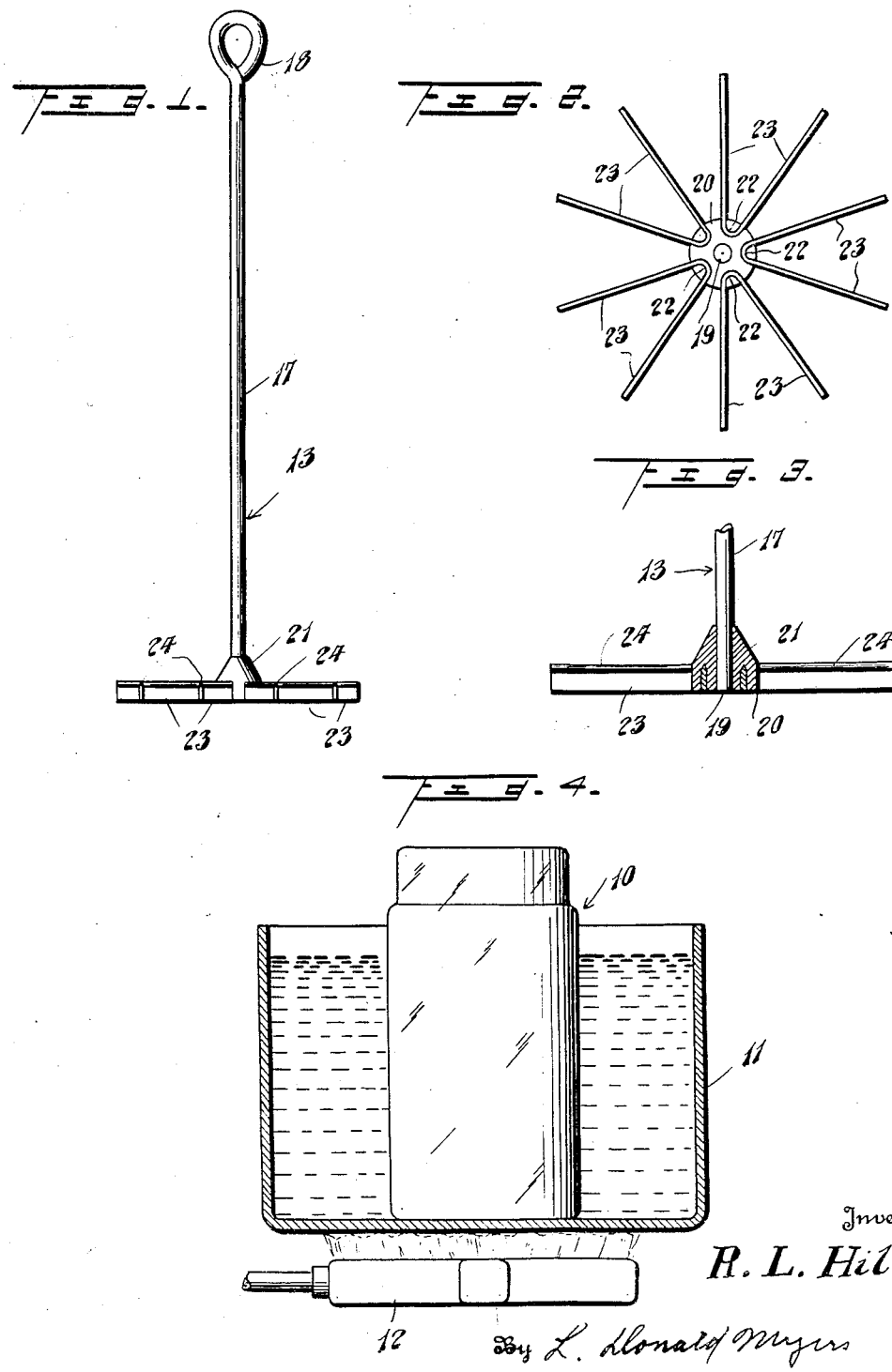

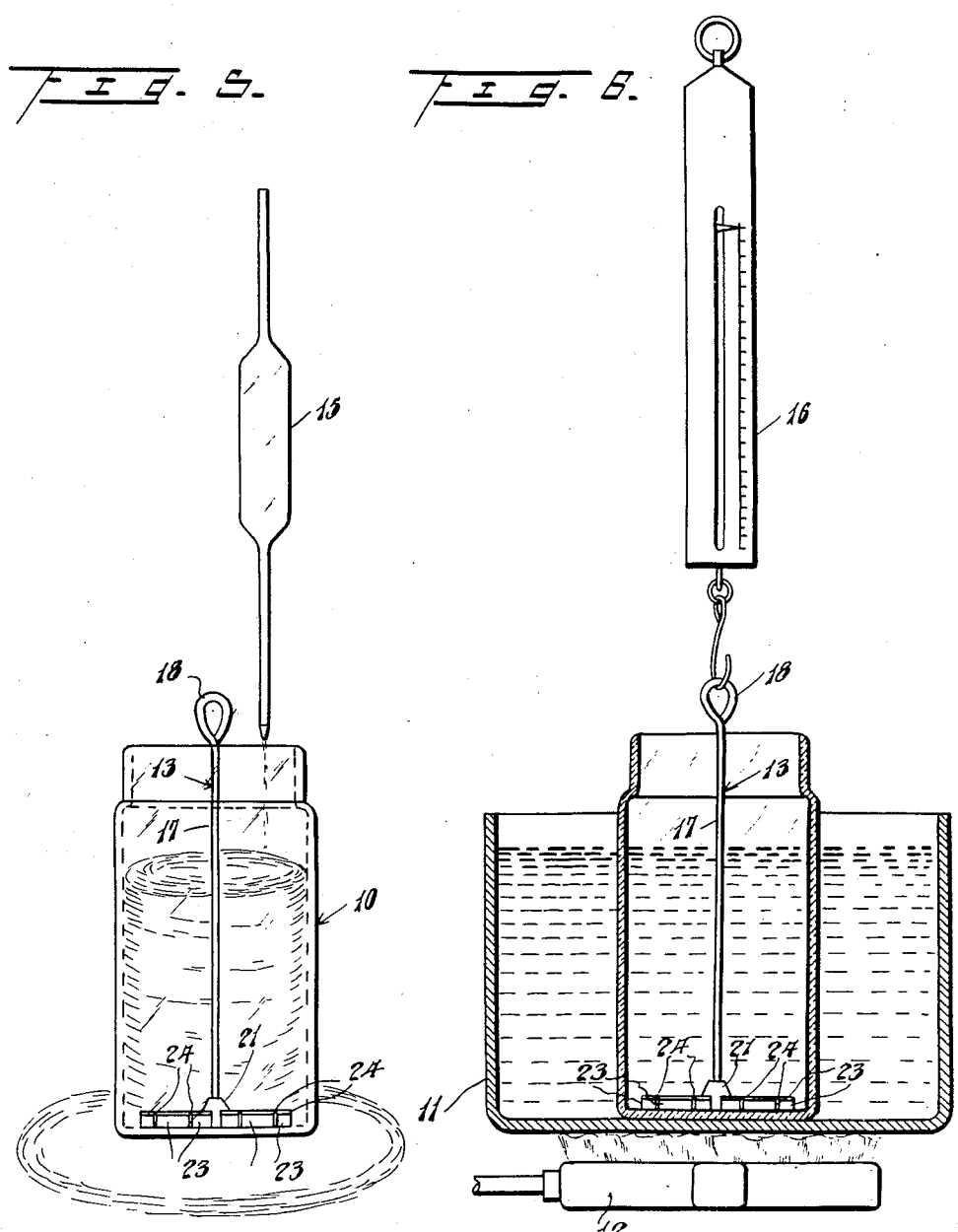

Patented Jan. 12, 1932

1,840,392

UNITED STATES PATENT OFFICE

REUBEN L. HILL, OF LOGAN, UTAH, ASSIGNOR TO UTAH STATE AGRICULTURAL COLLEGE, OF LOGAN, UTAH

PROCESS FOR DETERMINING THE PHYSICAL CURD CHARACTER OF MILK

Application filed October 13, 1928. Serial No. 312,392.

This invention relates to a process for determining the physical curd character of milk.

In the feeding of infants, cow's milk is the best and most common substitute for human milk. In the feeding of delicate infants, however, considerable difficulty is often experienced from its use. The ideal substitute for mother's milk has not been found, and most of the clinical effort has been directed toward the modification of cow's milk for infants.

Comparatively little research has been done on the difference in the digestibility and food value of milks from different cows for the infant. It is a well-known fact that the curd of cow's milk forms in a tough mass which varies considerably from the soft flaky curd obtained from human milk. That there is a wide variation in the toughness and elasticity of the curd obtained from the milk of different cows is not generally known. Variation in these characteristics of the curd of milk from different cows has been given very little attention in the field of research.

One of the main objects of this invention is to provide a process for determining the physical curd character of milk.

Another important object of the invention is to provide apparatus suitable for performing the above referred to process.

Other objects and advantages of the invention will be apparent during the course of the following description:

In the accompanying drawings forming a part of this specification and in which like numerals are employed to designate like parts throughout the same, Figure 1 is a side elevational view of a curd knife, Figure 2 is a bottom plan view of the knife, Figure 3 is a fragmentary vertical sectional view of said knife, Figure 4 is a partly elevational view and partly sectional view of a water bath and a container employed in the process of coagulating milk, Figure 5 is an elevational view of the apparatus employed for carrying out an additional step in the process, and Figure 6 is a partly elevational view and partly sectional view of the apparatus employed for carrying out a further step in the process.

In carrying out the process for determining the physical curd character of milk, the latter should be tested as soon as possible after it is drawn from the cow, as a marked increase in acidity will alter the results of the process. When comparative results are to be obtained, the milk samples should be maintained at a constant temperature and the process should be carried out in connection with each sample the same length of time after milking. Of course, duplicate samples of milk should be employed for comparative results.

It is believed to be unnecessary to draw any comparisons between milk drawn from different cows to impart a full understanding of the process and for this reason, the latter will be described in connection with one sample. A desired sample or quantity, preferably 100 c. c., of thoroughly mixed milk should be placed in a container of the general type designated by the reference character 10, see Figs. 4, 5, and 6. The container is then immersed in a water bath 11 which is heated by any suitable means, such as a burner 12, for raising the temperature of the milk to from 30 to 40° C. Best results have been obtained by maintaining the milk at a constant temperature of 35° C. throughout the entire process.

After the sample of milk is brought up to the desired temperature, a curd knife, designated in its entirety by the reference character 13, is placed in the container and rests upon the bottom thereof.

The container then should be removed from the water bath 11 for the purpose of agitating the milk during the mixing of a coagulant therewith. For the purpose of producing a very thorough mixture, the container should be agitated to give the milk a circular motion while the coagulant is being added. It has been found that a movement of the container in a circular path, as designated by the reference character 14, in Fig. 5, will produce the desired circular motion of the milk. The container may be agitated by hand or by any suitable form of mechanical means. It is believed unnecessary to illustrate mechanism which will agitate the container in the manner described as a disclosure of such a mechanism is not necessary for a complete understanding of the process. Preferably about 10 c. c. of freshly mixed coagulant should be added to the sample by means of a very rapidly flowing pipette and the last of the coagulant should be forcibly expelled from the pipette.

After adding the coagulant, the container should be returned to the water bath 11, care being taken not to agitate the same for a period of approximately ten minutes. The spring balance 16 then should be connected to the curd knife 13 and by a slow and even tension the knife should be drawn through the curd now present in the container. The spring balance 16 will give a gram reading and the amount of tension required for moving the knife through the curd will be read directly upon the balance. It is very essential that the spring balance be held perpendicularly and directly above the curd knife; otherwise, friction of the mechanism within the scales will render the results of the process inaccurate.

For a more complete understanding of the apparatus employed for carrying out the above process, reference will be had to the structures disclosed in the various figures.

In Figs. 1 to 3, inclusive, the curd knife is illustrated as consisting of a stem 17 bent to form a loop 18 at one end and having its remaining end 19 suitably connected to a head 20 which may be of cylindrical form with the exception of the tapered portion 21 which is presented to the intermediate portion of the stem 17. By examining Figs. 2 and 3, it will be seen that the cylindrical portion of the head 20 is formed with a plurality of substantially U-shaped slots 22. Positioned within these slots are the blades 23 which are sharpened at their upper edges 24.

It has been found that a curd knife made with the following dimensions will provide more accurate results in combination with the specific apparatus to be described later. The head 20 of the knife is preferably 3/8 inch in diameter and is tapered at 21 to fit over the stem 17 which is preferably of 1/8 inch material. The stem is approximately 6 inches in length, including the looped end. It has been determined that ten blades 23 will produce the best results and these blades are cut in double length from 1/20 inch sheet brass approximately 1/8 inch in thickness. The double length blades are bent at an angle of 36° and are soldered into the slots 22 in the manner best illustrated in Fig. 2. The various blades then will be equally spaced. A knife made of the above referred to dimensions will weigh approximately 18 grams.

The knife should not vary in weight more than 1/2 gram.

The container 10 preferably should be about 2 1/4 inches inside diameter and about 2 inches at the neck. If more than one jar is used, they should be examined for uniformity.

I do not desire to be limited to the use of any particular form of pipette as all that is required of this element is that the coagulant may be very rapidly fed into the sample of milk and that the last of the coagulant may be forcibly expelled from the pipette. A suitable form of pipette is shown in Fig. 5 and is designated by the character 15. It is believed to be unnecessary to explain the operation of this pipette as it is of a type to be found in most laboratories.

For coagulating the milk a pepsin-calcium-chloride mixture preferably is used. Marked differences in the physical curd character may be determined by the use of pepsin alone. The use of calcium chloride mixed with the pepsin, however, increases the variation and decreases the coagulating time and gives a more uniform coagulation.

The coagulant consists of a mixture of three parts of a 0.6 percent solution of 1 to 3000 scale pepsin to one part of a 37.8 percent solution of crystalline calcium chloride containing 378 grams of dry granular calcium chloride per liter of solution.

For measuring the pull required to draw the curd knife 13 through the curd, the spring balance 16 should be specially constructed with a capacity of 200 grams and a sensitivity of 1/2 gram is used. This step of the process has been carried out with a spring balance having a capacity of 250 grams and a sensitivity of 5 grams and fairly satisfactory results have been obtained. Any balance used with the specific type of curd knife above referred to should have a start of 18 grams; so the curd knife is tared.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. A process for determining the physical curd character of milk comprising maintaining a quantity of milk at a uniform temperature, mixing the milk with a rapidly acting acid-free coagulant to produce curd, and finally measuring the toughness and elasticity of said curd while maintained at said temperature.

2. A process for determining the physical curd character of milk comprising maintaining a quantity of milk at a uniform temperature, mixing the milk with an acid-free coagulant to produce curd, and finally measuring the force required to move an object through said curd while maintained at said temperature.

3. A process for determining the physical curd character of milk comprising placing a predetermined quantity of milk in a container, heating and maintaining the milk at a uniform temperature by placing it in heat exchange relation with a heating medium, rapidly mixing an acid-free coagulant with the milk to produce curd, and finally measuring the elasticity and toughness of said curd while being heated by said medium.

4. A process for determining the physical curd character of milk comprising heating a quantity of milk to a predetermined temperature, submerging a curd knife in the milk when the latter reaches said temperature, mixing an acid-free coagulant with the heated milk by agitating the same while rapidly feeding the coagulant into the mass of milk, maintaining said predetermined temperature while mixing and coagulating and allowing the mixture to stand without agitating until thoroughly coagulated, and finally measuring the force required to move the curd knife through the resultant curd.

5. A process for determining the physical curd character of milk comprising heating a quantity of milk to a predetermined temperature, quickly mixing with the milk a rapidly acting coagulant consisting of pepsin-calcium-chloride to produce curd, and finally measuring the elasticity and toughness of said curd while maintained at said temperature.

6. A process for determining the physical curd character of milk comprising heating a quantity of milk to a temperature of from thirty to forty degrees C., submerging a curd knife in the heated milk, quickly mixing with the milk, to prevent material loss of heat, a rapidly acting acid-free coagulant capable of producing maximum and uniform coagulation, agitating the milk during mixing, permitting the mixture to rest while coagulation takes place, moving said knife through the curd to measure the elasticity and toughness of the latter, and maintaining the mixture within the above temperature range while coagulation takes place and while the elasticity and toughness of the curd is measured.

7. A process for determining the physical curd character of milk comprising heating a quantity of milk to a temperature of thirty-five degrees C., submerging an object in the heated milk, quickly mixing with the milk, to prevent material loss of heat, a coagulant consisting of three parts of pepsin to one part of crystalline calcium chloride in solution which will rapidly produce maximum and uniform coagulation, agitating the milk during the mixing, permitting the mixture to rest while coagulation takes place, moving said object through the curd to measure the elasticity and toughness of the latter, and maintaining the mixture at the above temperature while coagulation takes place and while measuring the elasticity and toughness of the curd.

In testimony whereof, I affix my signature.
REUBEN L. HILL.